Figure 1:
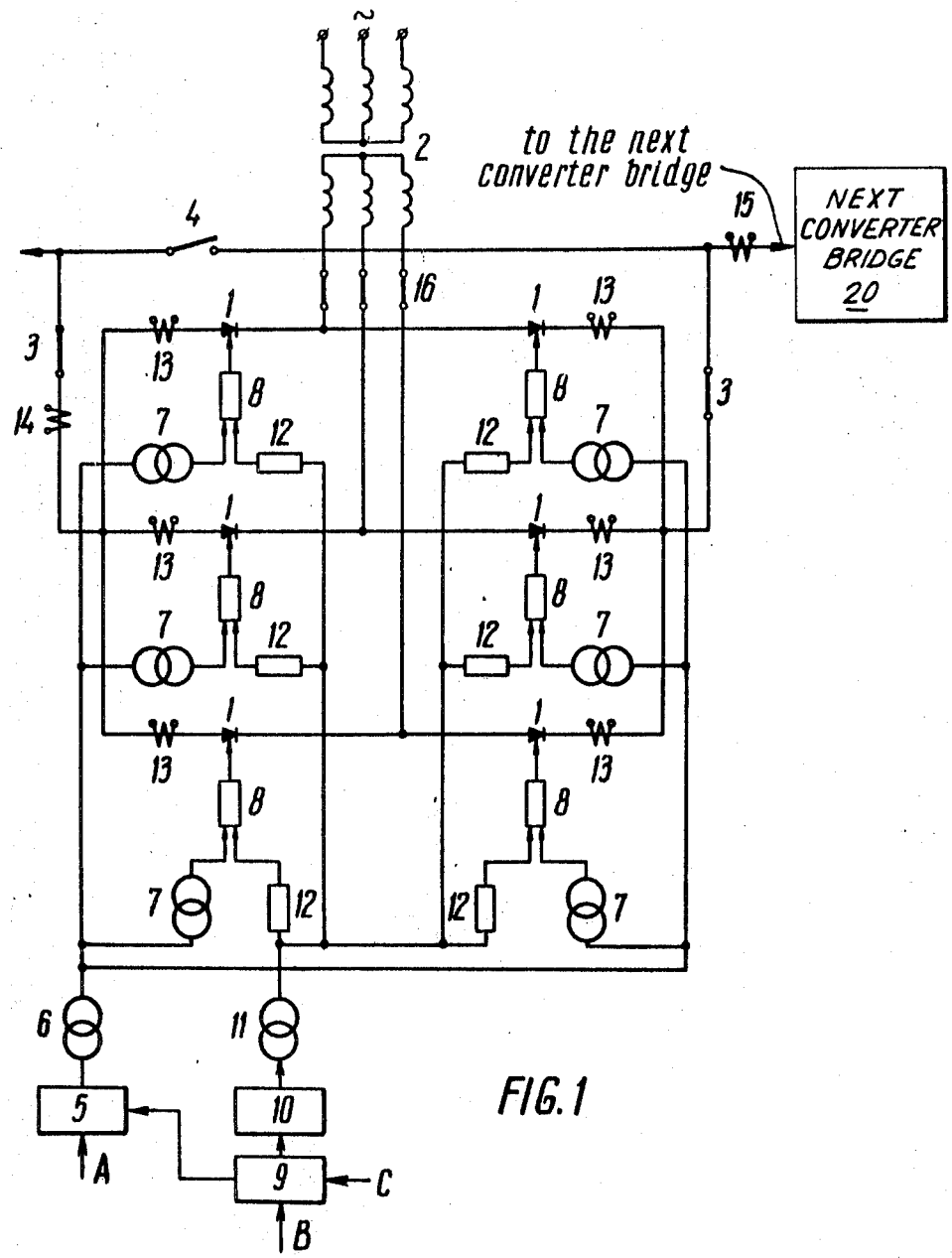

United States Patent

[11] 3,609,508

| [72] | Inventors | Kazimir Borisovich Gusakovsky<br>Grazhdansky prospekt, 51, kv. 25,<br>Leningrad;<br>Evgeny Mitrofanovich Semisalov,<br>Kantemirovskaya ulitsa, 17, kv. 6,<br>Leningrad; Vikenty Ivanovich Shiryaev,<br>prospekt Engelsa, 40, kv. 26, Leningrad,<br>U.S.S.R.; Boris Sergeevich Melik-Sarkisov,<br>Matveena Kirsanova, administrator,<br>prospekt Engelsa, 40, kv. 3, Leningrad,<br>U.S.S.R.; Anna Matveena Kirsanova,<br>prospekt Engelsa, 40, kv. 3, Leningrad,<br>U.S.S.R. of said Boris Sergeevich Melik-<br>Sarkisov |
|---|---|---|
| [21] | Appl. No. | 801,053 |
| [22] | Filed | Feb. 20, 1969 |
| [45] | Patented | Sept. 28, 1971 |

[54] CONTROLLED VALVE-TYPE CONVERTER
3 Claims, 3 Drawing Figs.

[52] U.S. Cl................................................. 321/5,
321/11, 321/13
[51] Int. Cl..................................................... H02m 7/00
[50] Field of Search........................................... 321/11–14,
18, 5

[56] References Cited
UNITED STATES PATENTS

| 2,532,108 | 11/1950 | Lamm ........................ | 321/11 |
| 2,684,460 | 7/1954 | Busemann .................... | 321/11 |
| 2,684,461 | 7/1954 | Busemann .................... | 321/11 |

Primary Examiner—William M. Shoop, Jr.
Attorney—Waters, Roditi, Schwartz & Nissen ABSTRACT: A controlled valve-type converter for substations of DC electric transmission lines with a plurality of series-connected three-phase valve-type bridges, wherein each of the devices adapted for short-time shunting of the bridge is so implemented that the operating valves of the bridge are made use of as shunting valves.

3,609,508

CONTROLLED VALVE-TYPE CONVERTER

The present invention relates generally to controlled valve-type converters, and more particularly to controlled valve-type converters employed in high-tension DC electric transmission lines.

Known in the art are controlled valve-type converters, comprising at least two-series-connected three-phase valve-type bridges, electrically connected to each of said bridges is a device for short-time shunting of the bridge involved, a device adapted for controlling the valves and an electrical protection unit.

In the above-mentioned converters, with a view of providing for operation in case of breakdowns occurring in one of the bridges involved, the aforesaid devices for short-time shunting of the bridge incorporate auxiliary controlled valves, the so-called shunting valves. Said devices are capable of shunting the faulty bridge and ensure passage of current through another bridge of the converter (cf., for example, the journal "Direct Current," 1960, v. 5, No. 2, pp. 52–65).

Concurrently, the devices for short-time shunting of the bridge involved made use of in the heretofore-known converters may sometimes lead to interference with normal operation of said converters, the operating valves of the bridge being in this case operable. The principle cases of faulty operation of the device for short-time shunting of the bridge are direct and back breakdowns of auxiliary valves, failures in firing and extinguishing of the latter. Apart from the abovesaid, the presence of shunting valves increases the cost of the valve-type converter and complicates its servicing.

The main object of the present invention is to provide a controlled valve-type converter with series-connection of the bridge involved, wherein with a view of short-time shunting of the bridge, use would be made of operating valves thereof.

According to the above-mentioned and other objects of the present invention, in the controlled valve-type converter, comprising at least two series-interconnected three-phase valve-type bridges, electrically connected to each of said bridges being a device for short-time shunting of the bridge, a device adapted for controlling the valves and an electrical protection unit, wherein, according to the present invention, each of the devices for short-time shunting of the bridge incorporates, depending upon the number of the bridge valves, voltage transformers, the primary winding of each of said voltage transformers being connected to the output of the protection unit, the secondary windings of each of said voltage transformers being switched into the inputs of one-phase bridge rectifiers, one winding directly and the other through a capacitor, which are series-interconnected at their inputs and switched through an electrical separating member to the input circuit of the phase valve grids which is selected for shunting the three-phase bridge.

Figure 2:
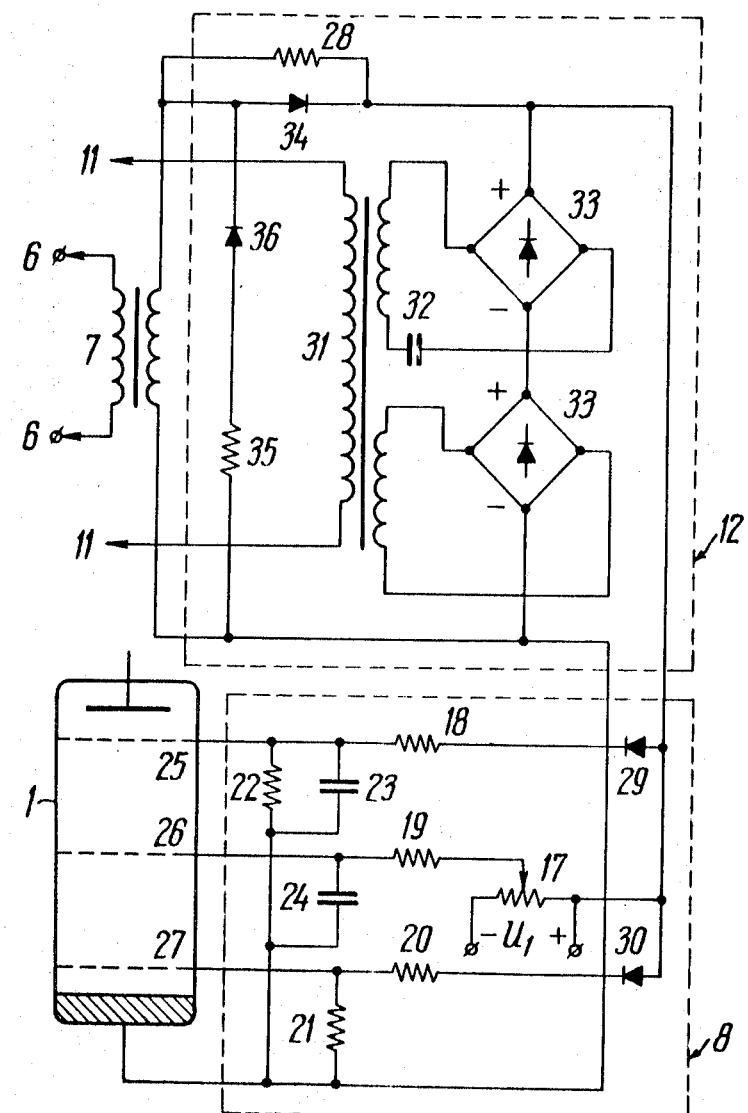
Figure 3:
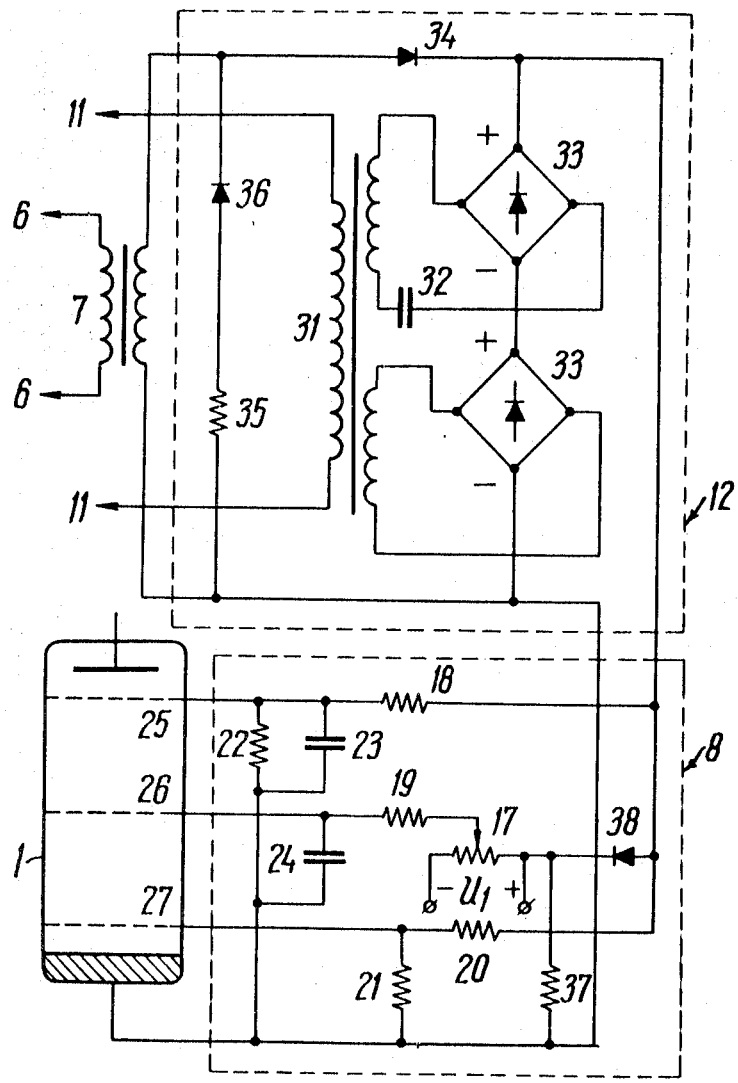

Other objects and advantages of the present invention will be more apparent from a detailed consideration of an exemplary embodiment thereof with due reference to the accompanying drawings, wherein:

FIG. 1 represents a circuit diagram of a valve-type converter of the invention, and FIGS. 2 and 3 represent respectively the embodiments of the circuit diagrams of the devices for short-time shunting of the bridge including grid units of the valves employed in the converter of the invention.

Considered in the present invention will be a converter comprising two identical series-connected three-phase valve-type bridges. For the sake of convenience in consideration, disclosed hereinbelow is the circuit of one bridge only although a second bridge 20 is illustrated in block form.

The three-phase valve-type bridge including controlled mercury-arc valves 1 (FIG. 1) and a master transformer 2 connected to the AC supply means, is formed as a three-phase bridge circuit and incorporates pole disconnecting switches 3 and quick-operating disconnecting switch 4 provided with an auxiliary arc chamber (not shown in the drawing).

One of the components members of the device adapted for controlling the valves 1 include an electronic circuit, which is essentially a six-phase amplifier 5 controlled by the signals available from a low-power generator (not shown in the drawing) and delivered in the direction indicated by the arrow A, generates operating control pulses and delivers them through a group isolating pulse transformer 6 and isolating pulse transformers 7 to grid units 8 of the valves made use of in the above-mentioned bridge.

The protection control pulses adapted for initiating the valves 1 of any one phase of the bridge, said phase being selected for shunting the above-mentioned bridge, are delivered from the output of a protection unit 9 and are applied to the grid units 8 of the valve 1 through a key 10, a group isolating voltage transformer 11 and a device 12 adapted for short-time shunting of the bridge involved.

Current transformers 13 are inserted in each arm of the bridge whereas DC transformers 14 and 15 are switched into a bridge pole and into a pole of the valve-type converter, respectively.

The protection unit 9 including electronic and relay circuits is supplied with input signals delivered in the direction indicated by the arrow B from the current transformer 13, 14 and 15, the voltage supplied to the aforesaid protection unit 9 is delivered from the AC supply mains in the direction indicated by the arrow C. Appearing at the corresponding moments at the output of the protection unit 9 is a variable voltage with a frequency corresponding to that of the AC supply mains. Unit 9 is a well known prior art device, such as that shown in U.S. Pat. No. 2,684,460.

The protection unit 9 comprises the devices adapted for protecting the present converter in case of such failures as back firing, missing of firing, insufficient angle of extinction, direct breakdown of valves, breakdown of dischargers and contact to earth, loss of vacuum, and so on.

The three-phase bridge is connected to the transformer 2 by means of a disconnecting switch 16.

Each of the group transformers 6 and 11 accommodates six one-phase transformers in one tank.

The grid unit 8 of the valve 1 and the device 12 adapted for short-time shunting of the bridge are made according to the circuit diagram represented in FIG. 2 above.

The grid unit 8 consists of resistors 17, 18, 19, 20, 21 and 22, and capacitors 23 and 24 connected in a certain way to the control grids 25, 26 and 27 of the valve 1.

The negative grid bias voltage is taken from the portion of the resistor 17 fed from the supply source $U_1$ and through the secondary winding of the transformer 7 and the resistor 28 is applied serially to the circuit of the grid 26.

The diodes 29 and 30 are adapted for taking the negative half-wave of the control pulse from the grids 25 and 27.

The device 12 adapted for short-time shunting of the bridge incorporates a voltage transformer 31 whose primary winding is connected to the transformer 11 and the secondary winding, one directly and the other through a capacitor 32 are connected to the inputs of the one-phase bridge rectifiers 33 which are series-interconnected at their outputs.

In addition the device 12 is provided with an electrical separating member which is in fact a diode 34 and a resistor 35 complete with a diode 36 for the current of the inverse half-wave of the control pulse involved.

The above-mentioned device 12 adapted for short-time shunting of the bridge and the grid unit 8 of the valve 1 both represented in FIG. 3 hereinabove made use of in the second embodiment differ from the corresponding device adapted for short-time shunting of the bridge and the grid unit represented in FIG. 2 hereinabove in the fact that the device 12 is devoid of the resistor 28, whereas in the grid unit 8 the negative grid bias voltage taken from the portion of the resistor 17 fed from the supply source $U_1$ is introduced into the circuit of the grid 26 in parallel through the use of the resistors 17 and 37.

Moreover, the grid unit 8 of the valve 1 is devoid of the diodes 29 and 30 and at the same time is provided with a diode 38 which is adapted for preventing the possibility of shorting the supply source $U_1$ through the secondary winding of the transformer 7.

The present valve-type converter makes provision for the following operating duties: normal operation, operation at breakdowns and putting the bridge into operation with operative converter.

NORMAL OPERATION

In all operative bridges of the converter the disconnecting switches 3 are engaged in operation and the disconnecting switches 4 are disconnected. The main transformer 2 is switched into the bridge by the disconnecting switch 16. The valves 1 of each of the bridges are controlled by the operating pulses available from the particular amplifiers 5. The group isolating voltage transformer 11 is disconnected from the protection unit 9 by the key 10. The protection unit 9 controls the operation of the valves 1 made use of in the bridge involved.

The operating control pulse arriving from the transformer 7, according to FIGS. 2 and 3, are then applied through the diode 34 to the grid unit 8 of the valve 1, thereby providing firing of the control grids 25, 26 and 27 in the desired sequential order.

The negative half-wave of the operating pulse passes through the diode 36 and the resistor 35, whereas in the embodiment of the invention of FIG. 2, through the rectifiers 33 and the resistor 28, in addition.

OPERATION IN CASE OF BREAKDOWNS

In case of breakdown occurring in the bridge or in the converter the protection unit 9 determines the character of the breakdown and according to the preset program tries to eliminate the fault. If the devices adapted for controlling the valves 1 fail to eliminate the fault involved, the bridge protection unit 9 makes the grids 25, 26 and 27 nonconducting through the six-phase amplifier 5 and supplies, through the use of the key 10 and the voltage transformer 11, the voltage to the devices 12 of that phase of the bridge that is selected by the protection unit 9 for shunting the bridge involved.

The program of selecting the phase for shunting the bridge envisages two ways for solution of the problem involved.

The first way consists in the fact that the choice of the phase for shunting the bridge is effected automatically through the employment of the protection unit 9. The aforesaid protection unit 9 determines the nature of the fault, detects the conducting valves 1 of the bridge and makes the choice of the valves of the phase that is capable of providing the most probable elimination of the fault involved.

The second way consists in the fact that the phase shunting the bridge is selected in advance and the bridge protection unit 9 acts upon said phase constantly irrespective of the kind of the breakdown occurring in the bridge. The aforesaid method is resorted to in case certain difficulties arise in mounting the current transformers 13 in each arm.

In case of a shunting valve the primary winding of the transformer 31 of the two valves 1 of the bridge phase is supplied with variable voltage which is rectified by the one-phase bridge rectifiers 33 and is applied to the grid unit 8 of the selected valves 1, thereby ensuring firing of the control grids 25, 26 and 27 in the mode of operation of a shunting valve for the time determined by the protection unit 9.

Since the remaining valves 1 are nonconducting, the current flows through the valves of the phase selected for shunting the bridge. There are two variants possible for eliminating the faults involved, the choice of which is accomplished by the bridge protection unit 9.

According to the first variant, upon elapsing of the time delay necessary to automatically put the bridge into operation, the protection pulse is removed from the valves 1 which operate in the mode of a shunting valve, the operating control pulse are initiated and the bridge is involved in normal operation.

According to the second variant the bridge is completely withdrawn from operation by switching on the disconnecting switch 4 and switching off the disconnecting switches 3 and 16.

PUTTING THE BRIDGE INTO OPERATION WITH THE CONVERTER OPERATIVE

The converter current passes through the switched-on disconnecting switch 4 of the bridge to be put into operation. The disconnecting switches 3 and 16 are switched on and the protection pulses are delivered for firing the valves 1 of the bridge phase selected for shunting.

The contacts of the arc chamber of the disconnecting switch 4 are brought apart and under the effect of voltage appeared across the contacts of the arc chamber, the current involved passes through the valves 1 of the bridge.

The protection unit 9 in case of the availability of current in the valves 1 of the bridge to be put into operation sends a command for switching off the disconnecting switch 4. Then, by the key, 10 the variable voltage is taken from the input of the device 12 and the devices 5 adapted for controlling the valves 1 are involved in operation. The operation of the device 12 in this mode of operation is accomplished analogously to that described hereinabove.

The main advantages of the present controlled converter are as follows: increased reliability in operation, reduced costs and improved characteristics of transient process in case of breakdowns on the transmission line.

The increased reliability in operation is provided by elimination of such breakdowns of the shunting valve as direct and back breakdowns, failures in firing extincting, as well as due to substantial simplified technique of putting the bridge into operation with operative converter.

The improved characteristics of transient processes in case of breakdowns on the transmission line are provided by eliminating overvoltages appearing across the power equipment or apparatus with pulsations of the current flowing through the converter by application of the pulses of practically unlimited pulse duration to the valves selected for shunting the bridge involved.

Though this invention has been described herein with reference to the preferable embodiment, it will be understood that minor changes in the details of the construction may be made without departing from the spirit and scope of the invention, as well be readily understood by those competent in the art.

All these alterations and changes will be considered to remain within the spirit and scope of the invention and claims that follow.

We claim:

1. A controlled valve-type converter for substations of DC electric transmission lines, comprising at least two series-interconnected three-phase valve-type bridges; devices for controlling said bridges electrically connected to each of said bridges; electrical protection units for said bridges electrically connected to each of said bridges; a plurality of voltage transformers with one voltage transformer corresponding to a respective valve in said bridges, said voltage transformers being included in said devices for short-time shunting of said bridges; each of said plurality of voltage transformers having one separate primary winding and two separate secondary windings; the primary windings of said voltage transformers being connected to the output of said bridge protection unit; one-phase bridge rectifiers serially interconnected at their outputs, one of the secondary windings of said transformers being directly connected to the input of one of said rectifiers, and the other secondary winding being connected through a capacitor to the input of the other of said rectifiers; electrical separating members connected to the inputs of said devices for controlling said valve and to input grid circuits of said valves of the phase selected by the bridge protection unit for shunting each of the three-phase bridges.

2. A controlled valve-type converter as claimed in claim 1, wherein said valves are normally operating valves and are shunting valves when said short-time shunting of said bridge is effected.

3. A controlled valve-type converter as claimed in claim 1, wherein each of said separating members comprises a series connection of a resistor and a first diode, and a second diode connected to said first diode.